United States Patent
Thomas et al.

(10) Patent No.: US 7,167,993 B1
(45) Date of Patent: *Jan. 23, 2007

(54) THERMAL AND POWER MANAGEMENT FOR COMPUTER SYSTEMS

(76) Inventors: C. Douglas Thomas, 1193 Capri Dr., Campbell, CA (US) 95008; Alan E. Thomas, 424 Atlantic Ave., Ocean City, NJ (US) 08226

( * ) Notice: Subject to any disclaimer, the term of this patent is extended or adjusted under 35 U.S.C. 154(b) by 181 days.

This patent is subject to a terminal disclaimer.

(21) Appl. No.: 10/277,630

(22) Filed: Oct. 22, 2002

Related U.S. Application Data

(63) Continuation of application No. 09/782,680, filed on Feb. 12, 2001, now Pat. No. 6,487,668, which is a continuation of application No. 09/351,051, filed on Jul. 10, 1999, now Pat. No. 6,216,235, which is a continuation of application No. 08/914,299, filed on Aug. 18, 1997, now Pat. No. 5,974,557, which is a continuation of application No. 08/262,754, filed on Jun. 20, 1994, now Pat. No. 5,752,011.

(51) Int. Cl.
*G06F 1/32* (2006.01)
*G06F 1/08* (2006.01)

(52) U.S. Cl. .................... 713/322; 713/501

(58) Field of Classification Search ............ 713/322, 713/501, 320, 323, 500
See application file for complete search history.

(56) References Cited

U.S. PATENT DOCUMENTS

| | | |
|---|---|---|
| 3,453,601 A | 7/1969 | Bogert et al. |
| 3,941,989 A | 3/1976 | McLaughlin et al. |
| 4,279,020 A | 7/1981 | Christian et al. |
| 4,293,927 A | 10/1981 | Hoshii |
| 4,381,552 A | 4/1983 | Nocilini et al. |
| 4,409,665 A | 10/1983 | Tubbs |
| 4,448,543 A | 5/1984 | Vail |
| 4,670,837 A | 6/1987 | Sheets |
| 4,672,228 A | 6/1987 | Swoboda |

(Continued)

FOREIGN PATENT DOCUMENTS

| | | |
|---|---|---|
| EP | 0 157 507 | 10/1985 |
| EP | 0 214 297 A1 | 3/1987 |
| EP | 0363567 | 4/1990 |
| EP | 0364222 | 4/1990 |
| EP | 0368144 | 5/1990 |
| EP | 0381021 | 8/1990 |
| EP | 0 419 908 A2 | 4/1991 |
| EP | 0 426 410 B1 | 5/1991 |
| EP | 0 456 012 B1 | 11/1991 |

(Continued)

OTHER PUBLICATIONS

"Cooling Control," IBM Technical Disclosure Bulletin, vol. 18, No. 6, pp. 1705–1706, Nov. 1975.

"Computerized Control of Chilled Water System," IBM Technical Disclosure Bulletin, vol. 20, No. 8, pp. 2981–2984, Jan. 1978.

"Variable Air Cooling for Computer And/Or Electronic Equipment," IBM Technical Disclosure Bulletin, vol. 32, No. 10A, pp. 196–198, Mar. 1990.

Advanced Power Management (APM), BIOS Interface Specification, Revision 1.1, Sep. 1993.

(Continued)

*Primary Examiner*—Thuan Du

(57) ABSTRACT

Improved approaches to providing thermal and power management for a computing device are disclosed. These approaches facilitate intelligent control of a processor's clock frequency and/or a fan's speed so as to provide thermal and/or power management for the computing device.

29 Claims, 8 Drawing Sheets

U.S. PATENT DOCUMENTS

| | | | |
|---|---|---|---|
| 4,686,386 A | 8/1987 | Tadao | |
| 4,689,659 A | 8/1987 | Watanabe | |
| 4,698,748 A | 10/1987 | Juzswik et al. | |
| 4,722,669 A | 2/1988 | Kundert | |
| 4,734,871 A * | 3/1988 | Tsunoda et al. | 700/300 |
| 4,756,473 A | 7/1988 | Takemae et al. | |
| 4,812,733 A | 3/1989 | Tobey | |
| 4,851,987 A | 7/1989 | Day | |
| 4,893,271 A | 1/1990 | Davis et al. | |
| 4,924,112 A | 5/1990 | Anderson et al. | |
| 4,970,497 A | 11/1990 | Broadwater et al. | |
| 4,980,836 A | 12/1990 | Carter et al. | |
| 5,021,679 A | 6/1991 | Fairbanks et al. | |
| 5,025,387 A | 6/1991 | Frane | |
| 5,036,493 A | 7/1991 | Nielsen | |
| 5,058,389 A | 10/1991 | Yasuda et al. | |
| 5,115,225 A | 5/1992 | Dao et al. | |
| 5,121,291 A | 6/1992 | Cope et al. | |
| 5,125,088 A | 6/1992 | Culley | |
| 5,132,632 A | 7/1992 | Russell et al. | |
| 5,134,703 A | 7/1992 | Bumbarger | |
| 5,142,684 A | 8/1992 | Perry et al. | |
| 5,167,024 A | 11/1992 | Smith et al. | |
| 5,189,314 A | 2/1993 | Georgiou et al. | |
| 5,201,059 A | 4/1993 | Nguyen | |
| 5,218,704 A | 6/1993 | Watts, Jr. et al. | |
| 5,222,239 A | 6/1993 | Rosch | |
| 5,230,055 A | 7/1993 | Katz et al. | |
| 5,230,074 A | 7/1993 | Canova, Jr. et al. | |
| 5,239,652 A | 8/1993 | Seibert et al. | |
| 5,241,680 A | 8/1993 | Cole et al. | |
| 5,249,741 A | 10/1993 | Bistline et al. | |
| 5,254,928 A | 10/1993 | Young et al. | |
| 5,287,244 A | 2/1994 | Hileman et al. | |
| 5,287,292 A | 2/1994 | Kenny et al. | |
| 5,291,607 A | 3/1994 | Ristic et al. | |
| 5,349,688 A | 9/1994 | Nguyen | |
| 5,349,823 A | 9/1994 | Solomon | |
| 5,355,501 A | 10/1994 | Gross et al. | |
| 5,359,234 A | 10/1994 | Atriss et al. | |
| 5,369,771 A | 11/1994 | Gettel | |
| 5,375,230 A | 12/1994 | Fujimori et al. | |
| 5,381,043 A | 1/1995 | Kohiyama et al. | |
| 5,388,265 A | 2/1995 | Volk | |
| 5,392,437 A | 2/1995 | Matter et al. | |
| 5,396,635 A | 3/1995 | Fung | |
| 5,416,726 A | 5/1995 | Garcia-Duarte et al. | |
| 5,418,751 A | 5/1995 | Kaiser | |
| 5,422,806 A * | 6/1995 | Chen et al. | 700/29 |
| 5,422,832 A | 6/1995 | Moyal | |
| 5,426,755 A | 6/1995 | Yokouchi et al. | |
| 5,428,790 A | 6/1995 | Harper et al. | |
| 5,430,881 A | 7/1995 | Ikeda | |
| 5,457,766 A | 10/1995 | Ko | |
| 5,469,320 A | 11/1995 | Walker et al. | |
| 5,469,561 A * | 11/1995 | Takeda | 713/600 |
| 5,473,767 A | 12/1995 | Kardach et al. | |
| 5,475,847 A | 12/1995 | Ikeda | |
| 5,483,102 A | 1/1996 | Neal et al. | |
| 5,483,656 A | 1/1996 | Oprescu et al. | |
| 5,485,127 A | 1/1996 | Bertoluzzi et al. | |
| 5,498,971 A | 3/1996 | Turnbull et al. | |
| 5,500,509 A | 3/1996 | Vogt | |
| 5,502,838 A | 3/1996 | Kikinis | |
| 5,504,907 A | 4/1996 | Stewart et al. | |
| 5,504,908 A | 4/1996 | Ikeda | |
| 5,504,924 A | 4/1996 | Ohashi et al. | |
| 5,511,203 A | 4/1996 | Wisor et al. | |
| 5,526,289 A | 6/1996 | Dinh et al. | |
| 5,535,401 A | 7/1996 | Rawson, III et al. | |
| 5,539,681 A | 7/1996 | Alexander et al. | |
| 5,546,568 A | 8/1996 | Bland et al. | |
| 5,546,591 A | 8/1996 | Wurzburg et al. | |
| 5,557,550 A | 9/1996 | Vigil et al. | |
| 5,557,551 A | 9/1996 | Craft | |
| 5,560,001 A | 9/1996 | Kardach et al. | |
| 5,560,002 A | 9/1996 | Kardach et al. | |
| 5,560,020 A | 9/1996 | Nakatani et al. | |
| 5,561,792 A | 10/1996 | Ganapathy | |
| 5,574,667 A | 11/1996 | Dinh et al. | |
| 5,579,524 A | 11/1996 | Kikinis | |
| 5,586,332 A | 12/1996 | Jain et al. | |
| 5,590,061 A | 12/1996 | Hollowell, II et al. | |
| 5,622,789 A | 4/1997 | Young | |
| 5,623,594 A | 4/1997 | Swamy | |
| 5,625,826 A | 4/1997 | Atkinson | |
| 5,630,148 A | 5/1997 | Norris | |
| 5,632,037 A | 5/1997 | Maher et al. | |
| 5,664,118 A | 9/1997 | Nishigaki et al. | |
| 5,664,201 A | 9/1997 | Ikedea | |
| 5,664,205 A | 9/1997 | O'Brien et al. | |
| 5,687,079 A | 11/1997 | Bauer et al. | |
| 5,706,407 A | 1/1998 | Nakamura et al. | |
| 5,719,800 A | 2/1998 | Mittal et al. | 364/707 |
| 5,721,837 A | 2/1998 | Kikinis et al. | |
| 5,721,937 A | 2/1998 | Kurihara et al. | |
| 5,745,375 A | 4/1998 | Reinhardt et al. | 364/492 |
| 5,809,336 A | 9/1998 | Moore et al. | |
| 5,812,832 A * | 9/1998 | Horne et al. | 713/501 |
| 5,838,578 A | 11/1998 | Pippin | |
| 5,848,282 A | 12/1998 | Kang | 395/750.05 |
| 5,920,264 A | 7/1999 | Kim et al. | 340/584 |
| 5,930,110 A | 7/1999 | Nishigaki et al. | |
| 6,014,611 A | 1/2000 | Arai et al. | |
| 6,016,548 A | 1/2000 | Nakamura et al. | |
| 6,243,656 B1 | 6/2001 | Arai et al. | |
| 6,317,841 B1 | 11/2001 | Nagae et al. | |
| 6,463,396 B1 | 10/2002 | Nishigaki | |
| 6,630,754 B1 * | 10/2003 | Pippin | 307/117 |
| 2002/0183973 A1 | 12/2002 | Nishigaki et al. | |

FOREIGN PATENT DOCUMENTS

| | | |
|---|---|---|
| EP | 0474963 | 3/1992 |
| EP | 0496536 | 7/1992 |
| EP | 0540287 | 5/1993 |
| EP | 0 566 395 A1 | 10/1993 |
| EP | 0 683 558 A1 | 11/1995 |
| EP | 0 785 496 A1 | 1/1997 |
| GB | 2235797 | 3/1991 |
| JP | 58-099821 A2 | 6/1983 |
| JP | 58-129524 A2 | 8/1983 |
| JP | 60-150137 A2 | 8/1985 |
| JP | 63-100522 A2 | 5/1988 |
| JP | 63-292313 | 11/1988 |
| JP | 2-054797 A2 | 2/1990 |
| JP | 2-083720 A2 | 3/1990 |
| JP | 2-083720 | 3/1990 |
| JP | 2-171813 | 7/1990 |
| JP | 2-299009 A2 | 12/1990 |
| JP | 3-116210 A2 | 5/1991 |
| JP | 4-095109 | 3/1992 |
| JP | 4-093344 | 8/1992 |
| JP | 5-011897 A2 | 1/1993 |
| JP | 5-053680 | 3/1993 |
| JP | 5-094229 | 4/1993 |
| JP | 5-095063 | 4/1993 |
| JP | 5-100063 | 4/1993 |
| JP | 5-108193 | 4/1993 |
| JP | 5108193 | 4/1993 |
| JP | 5-127785 | 5/1993 |
| JP | 5189100 | 7/1993 |

| | | |
|---|---|---|
| JP | 5-197460 | 8/1993 |
| JP | 5-224772 | 9/1993 |
| JP | 5-224773 | 9/1993 |
| JP | 5-251884 | 9/1993 |
| JP | 5-297993 | 11/1993 |
| JP | 5-313779 | 11/1993 |
| JP | 5-324867 | 12/1993 |
| JP | 6-019585 | 1/1994 |
| JP | 6-042494 | 2/1994 |
| JP | 6-075654 | 3/1994 |
| JP | 6-102959 | 4/1994 |
| WO | WO91/00523 | 1/1991 |
| WO | WO 91/00566 | 1/1991 |

OTHER PUBLICATIONS

Answer to Complaints re Case CV–03–5780 (C.D. CA).
Civil Docket Listing for Case No. CV–03–5780 (C.D. CA).
"A Method for Temperature Control in Portable Electronic Equipment", IBM Technical Disclosure Bulletin, May 1987.
"Automatically Controlled Air Cooling System for Small Machines", IBM Technical Disclosure Bulletin, Jan. 1982.
"Charge and Discharge Function in Notebook PC", IBM Technical Disclosure Bulletin, vol. 35, No. 4A, Sep. 1992.
"Dynamic Power Management By Clock Speed Variation", IBM Technical Disclosure Bulletin, vol. 32, No. 8B, Jan. 1990.
"External Thermo Electric Cooler Integrated Circuit Package", IBM Technical Disclosure Bulletin, vol. 33, No. 11, Apr. 1991.
"Gated Clock", IBM Technical Disclosure Bulletin, vol. 36, No. 5, May 1993.
"High Power LSI Performance Optimizer ", IBM Technical Disclosure Bulletin, Jan. 1991.
"High–Performance System Clock Generation Within Existing Very Large Scale Integration Chips", IBM Technical Disclosure Bulletin, vol. 35, No. 3, Aug. 1992.
HIGHSCREEN *Colani* BlueNote Notebook Computer User's Manual, Second Edition, Sep. 1993.
"Mechanism for Variable Speed Clock Based on an Incrementing Oscillator", IBM Technical Disclosure Bulletin, vol. 36, No. 3, Mar. 1993.
"Note Utilities User's Manual", HIGHSCREEN *Colani* BlueNote Notebook Computers, Second Edition, Sep. 1993.
Processor Option Cooling Kit for Personal Computers, IBM Technical Disclosure Bulletin, vol. 35, No. 6, Nov. 1992.
"Safe Device Power Managment", IBM Technical Disclosure Bulletin, vol. 36, No. 5, May 1993.
"System Temperature Monitoring Using On–Chip Thermocouples", IBM Technical Disclosure Bulletin, vol. 36, No. 6B, Jun. 1993.
"Technique for Power Management in Signal Processors", IBM Technical Disclosure Bulletin, vol. 35, No. 5, Oct. 1992.
"Two Speed Fan Control Using Current Sense", IBM Technical Bulletin, vol. 34, No. 8, Jan., 1992.
"Two–Speed Fan Control with Thermal Sensor", IBM Technical Disclosure Bulletin, Aug. 1994.
Bursky, Dave, Energy–Management Chip Supplements PC Power–Control ICs, Electronic Design, vol. 39, No. 12, Jun. 27, 1981.
Gable, Mel, "Designing a laptop computer with power management features", Electronic Engineering, vol. 62, No. 763, Jul. 1990, pp. 43–46.
Gallant, John, "Power Management", EDN, vol. 37, No. 21, Oct. 15, 1992, pp. 114–122.

Hilbert, Claude et al., "High Performance Micro–Channel Air Cooling", Sixth Annual IEEE, Semiconductor Thermal and Temperature Mesurement Symposium, Feb. 6–8, 1990, pp. 108–113.
Lee, T.Y. Tom et al., "Compact Liquid Cooling System for Small, Moveable Electronic Equipment", IEEE Transactions on Components, Hybrids, and Manufacturing Technology, vol. 15, No. 5, Oct. 1992, pp. 786–793.
Miller, Richard S., et al., "Improve Clock Synthesis in Laptops With a Frequency Generator", Electronic Design, vol. 39, No. 17, Sep. 12, 1991, pp. 111–120.
Steele, Jerr "ACPI Thermal Sensing and Control in the PC" Wescon Conference, IEEE Sep. 15, 1998, pp. 169–182.
Strassberg, Dan, "Cooling hot mircoprocessors", EDN, Jan. 20, 1994.
Swager, Anne, W., "Methods Converge to Cool Fast and Dense Circuit", EDN, vol. 35, No. 25, Dec. 6, 1990, pp. 162–168.
Xie, H., et al., "Thermal Solutions to Pemtium® Processors in TCP in Notebooks and Sub–Notebooks", 45 [th] Electonics Components & Technology Conference, May 1995, pp. 201–210.
Yuen, Desmond, "Intel's SL Architecture Desinging Portable Applications ", Intel/McGraw–Hill, i–321, © 1993.
Evergreen HV, PT86C268, Data Book, Pico Power, Version 1.0.2, pp. i–118, Mar. 1993.
Pine PT86C368, System Controller, Technical Reference Manual 1.0P, Pico Power, Pine Data Book, 206 Data Book, Product Briefs, pp. 1–51 (+reference schematics), Aug. 1993.
Tecra® 510DS/Tecra® 510CDT User's Guide, Toshiba, pp. i–547.
Cedar PT86C378, Data Book, Pico Power, Version 1.0P, pp. i–86 (+appendixes Cedar Data Book and Redwood Referemce Schematics), Mar. 1994.
Fir PT86C868 & PT86C818, Data Book, Pico Power, Version 1.0P, Pico Power, pp. 1–100, pp. i–106 (+appendixes A, B and C), Apr. 1994.
Spruce PT86C388 System Controller, Data Book, Version 1.0P, Pico Power, pp. 1–100, Apr. 21, 1994.
Redwood, PT86C668 & PT86C618, Technical Reference Manual, Version 3.0P, System Controller, Pico Power, pp. i–149, Jul. 1994.
Redwood Product Briefs, Pico Power, including Products Alert, dated May 3, 1994, pp. 1–2, Errata Summary, dated Nov. 3, 1994, pp. 1–20; Application Note, pp. 1–37, dated Jan. 20, 1993 through May 25, 1994.
Viper Notebook Chipset for the 3.3V Pentium®, Preliminary Data Book, Version 0.1, pp. 1–158, OPTi Inc., Apr. 1994.
Sager NP–840 Series Computer Brochure, 1993.
Redwood Product Bulletin, Energy–Efficient System Controller for 32–Bit CPUs, Pico Power, Dec. 1994.
Pine Product Bulletin, Power–Managed System Controller for '486 CPUs, Pico Power, Dec. 1994.
Pico Power Products, Schedule 1, Pico Powder, date unknown.
Golden Gate Product Bulletin, Pentium Processor Bridge Interface Controller, Pico Power, Dec. 1994.
Sequoia Product Bulletin, System Controller for Super–486 Processors, Pico Power, May 1995.
PCMCIA Plus, PT82C786, PCMCIA Host Adapter, Data Book, Version 1.1P, Pico Power, Jun. 1994.

PT82C206F–LV, Integrated Peripheral Controller, Pico Power, date unknown.

The Pico Power "Evergreen" 168, 486/386DX Portable Computer Core Chip, Preliminary Data Book, Version 1.3, Pico Power, Aug. 4, 1992.

Evergreen HV, PT86C268, System Controller, Data Book, Version 1.0.2, Pico Power, Mar. 1993.

Cedar Product Bulletin, Embedded Applications System Controller, Pico Power, Dec. 1994.

Spruce PT86C388, System Controller, Data Book, Version 1.0P, Pico Power, Apr. 21, 1994.

Vesuvius–LS, Preliminary Product Bulletin, 5–Class Processor PCI System Controller with Power Management, Cirrus Logic, Feb. 1996.

Nile, Preliminary Product Bulletin, Advanced PCI to PCI Bridge Interface Controller; Cirrus Logic, pp. 1–4, May 1996.

Fir, PT86C868 & PT86C818, System Controller, Data Book, Version 2.3P, Pico Power, A Cirrus Logic Company, Apr. 1994.

Redwood, PT86C668 & PT86C618, Technical Reference Manual, Version 3.0P, System Controller, Pico Power, Jul. 1994.

V–Plus, Advance Data Book, 5–Class Processor System Controller with Power Management, Version 1.1, Cirrus Logic, pp. 1–4, May 1996.

Topaz System Controller, P6 North Bridge Notebook Solution, High Integrated P6 North Bridge System Controller, Advance Product Bulletin, Pico Power, pp. 1–4, Jul. 1996.

Onyx System Controller, P6 North Bridge Desktop Solution, Highly Integrated P6 North Bridge Desktop System Controller, Jul. 1996.

Pico Power Desriptive Memorandum, J.P. Morgan, Appendix B: Product Literature re System Controllers, Interface Controllers (Bridge Chips) and Host Adapter, date unknown.

* cited by examiner

THERMAL AND POWER MANAGEMENT FOR COMPUTER SYSTEMS

CROSS REFERENCE TO RELATED APPLICATIONS

This application is a continuation of copending prior U.S. application Ser. No. 09/782,680, now U.S. Pat. No. 6,487,668, filed Feb. 12, 2001 which is a continuation application of U.S. application Ser. No. 09/351,051 filed on Jul. 10, 1999, now U.S. Pat. No. 6,216,235, which is a continuation application of U.S. application Ser. No. 08/914,299 filed on Aug. 18, 1997, now U.S. Pat. No. 5,974,557, which is a continuation application of U.S. application Ser. No. 08/262,754 filed Jun. 20, 1994, now U.S. Pat. No. 5,752,011, the disclosures of all of which are incorporated herein by reference.

BACKGROUND OF THE INVENTION

1. Field of the Invention

The present invention relates to a computing device and, more particularly, to a method and apparatus for controlling a processor's clock frequency.

2. Description of the Related Art

It is known that if no user activity has occurred for a period of time that a portable computer can be placed in a suspend or sleep mode. It is also known to suspend or slow a computer's processor (e.g., microprocessor, CPU) when the processor is not actively processing. The following patents and patent publications are representative of the current state of the art:

(a) U.S. Pat. No. 5,201,059 discloses a sleep mode which is activated when control is given to BIOS or alternatively by incorporating some statistical analysis of the frequency of BIOS calls. In this patent, the sleep mode either stops the clock or slows it to 4 MHz.

(b) U.S. Pat. No. 5,167,024 discloses a power management system for a laptop computer. The power management system operates to disconnect power sources and/or clock signals to various peripheral devices to conserve battery power. The slow mode is entered into when no activity has been detected for a predetermined period of time.

(c) U.S. Pat. No. 5,218,704 discloses a technique for power conservation based on real-time sampling of CPU activity. The activity is sampled during interrupts and when it determines that the CPU may rest, a sleep clock is supplied to the CPU. The detection of an interrupt restores the clock to the fast rate prior to processing the interrupt.

(d) U.S. Pat. No. 5,239,652 discloses a technique for power consumption which disconnects the CPU from the power supply when control logic determines the CPU is not actively processing. Thereafter, the CPU is periodically powered-up to perform housekeeping chores as well as to determine if normal processing should be resumed.

(e) European patent publication EP-0474963 discloses a sleep mode controller which lowers the CPU clock speed when no input/output operation (when keyboard control routine of BIOS executed no input key data in key buffer, or when CPU is idle and no input key data in the key buffer) is performed. The system uses a clock generator circuit which produces the low clock (4 MHz), the high clock (32 MHz) and a slightly slower high clock (16 MHz). A keyboard controller is used to determine which of the high clocks is used, with selection being made by the computer user. The sleep mode controller is disabled if the AC adapter is connected.

(f) U.S. Pat. No. 5,230,055 discloses a portable computer wherein the computer is made inoperable when ambient temperature or humidity become too high. Here, ambient temperature and humidity are periodically monitored.

(g) European patent publication EP-0381021 discloses a power saving system for a personal computer. The system operates to allow or stop power to be supplied to an oscillator based on control data set to a control register via a keyboard or software.

(h) U.S. Pat. No. 5,021,679 discloses a power system for a portable computer wherein the supply voltage is varied depending on the current being supplied to the computer by the power system. Further, a variable-frequency clock is provided which varies its frequency based on the supply voltage being produced.

External clocks have been used to provide a computer system with faster clocks. Here, the faster external clock is substituted for the internal clock of the computer system. U.S. Pat. No. 5,134,703 is illustrative of an external clock unit which supplies a faster clock to a computer without requiring any hardware changes within the computer.

The problem with all the prior solutions to energy conservation is that the processors can still overheat. In particular, during prolonged processing or activity by a computer's processor, the processor will not enter its sleep mode (if any) and as a result the processor will become hot and require extensive means to cool the processor to prevent overheating and eventual failure of the processor. Overheating and failure of the processor can also occur when the computer is used in particularly hot environmental temperatures, the computer's cooling fan fails, or when cooling of the processor is otherwise inadequate.

Another problem is that with portable computers, manufacturers have to either use a lower clock frequency (lower than would be used in a comparable desk top computer) for processing or provide a fan for cooling. A lower clock frequency is not satisfactory as users want maximum processing power just as they get with a desk top computer. Requiring a portable computer to use a fan for cooling is also unsatisfactory because it consumes battery energy.

Thus, there is a need for a solution to the above problems which enables a computing device to maximize its processing speed while, at the same time, preventing overheating.

SUMMARY OF THE INVENTION

Broadly speaking, the invention relates to novel techniques for providing thermal and power management for a computing device. These techniques facilitate intelligent control of a processor's clock frequency and/or a fan's speed so as to provide thermal and/or power management for the computing device.

The invention may be implemented as an apparatus or a method. According to one embodiment, the invention monitors a processor's activity and its temperature. When there is no activity for the processor, a slowed clock frequency is used, thereby saving power and lowering the thermal heat produced by the processor. On the other hand, when there is activity for the processor, a fast clock frequency is used. However, when prolonged activity (i.e., sustained fast clock frequency) causes the processor's temperature to become dangerously high for proper operation, the clock frequency is reduced so as to maintain processing speed at a reduced speed while preventing overheating.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention provides novel techniques for controlling a processor's clock frequency so as to prevent overheating. In addition to preventing overheating, the invention attempts to maximize the processing speed of the processor. The invention also operates to conserve the amount of energy consumed by the processor. Preventing the processor from overheating is important because when a processor overheats it no longer operates properly. Conservation of energy, although of general importance for all computing devices, is particularly important for portable computing devices.

The invention monitors a processor's activity and its temperature. When there is no activity for the processor, a slow clock frequency is used, thereby saving power and lowering the thermal heat produced by the processor. On the other hand, when there is activity for the processor, a fast clock frequency is used. However, when prolonged activity (i.e., sustained fast clock frequency) causes the processor's temperature to become dangerously high for proper operation, the clock frequency is reduced so as to maintain processing speed at a reduced speed while preventing overheating.

Embodiments of the invention are discussed below with reference to FIGS. 1–10. However, those skilled in the art will readily appreciate that the detailed description given herein with respect to these figures is for explanatory purposes as the invention extends beyond these limited embodiments.

Figure 1:
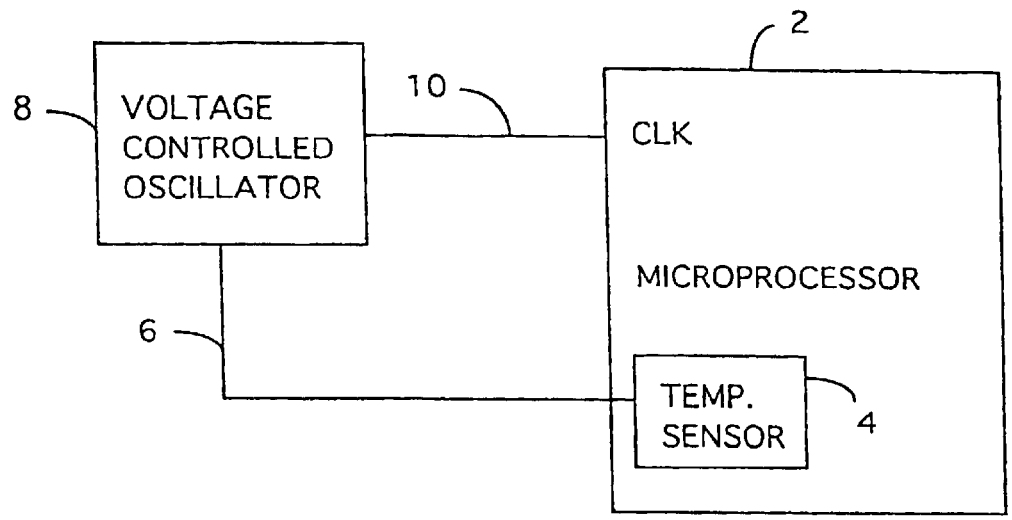
FIG. 1 is block diagram of a first embodiment of the invention.

FIG. 1 is a block diagram of a first embodiment of the invention. In this embodiment, a microprocessor 2 has a temperature sensor 4 which is integral with the microprocessor 2. The temperature sensor 4 is either integrated within the Very Large Scale Integration (VLSI) design of the microprocessor 2 or placed in contact with the housing or package thereof. In either case, the temperature sensor 4 is thermally coupled with the microprocessor 2. Because the temperature sensor 4 is integral or thermally coupled with the microprocessor 2, the temperature sensor 4 is very responsive to the temperature changes of the microprocessor 2. The temperature sensor 4 produces a temperature signal 6. Temperature sensing circuitry is well known and therefore not further described.

The temperature signal 6 is supplied to a voltage-controlled oscillator (VCO) 8. The VCO 8 produces a clock signal 10 which is supplied to a clock input of the microprocessor 2. The VCO 8 operates to produce different frequencies for the clock signal 10 depending on the value of the temperature signal. In this embodiment, the temperature signal 6 is preferably an analog voltage signal and the VCO 8 produces the clock signal 10 based on the value of the analog voltage signal. For example, the temperature signal could be a voltage ranging from zero to five volts. In response to the temperature signal 6, the VCO 8 could produce the clock signal with frequencies ranging from 100 MHz to 1 MHz. The frequency range is a design choice selected in accordance with the specific microprocessor being utilized. VCO's are well known and therefore are not further described.

Figure 2:
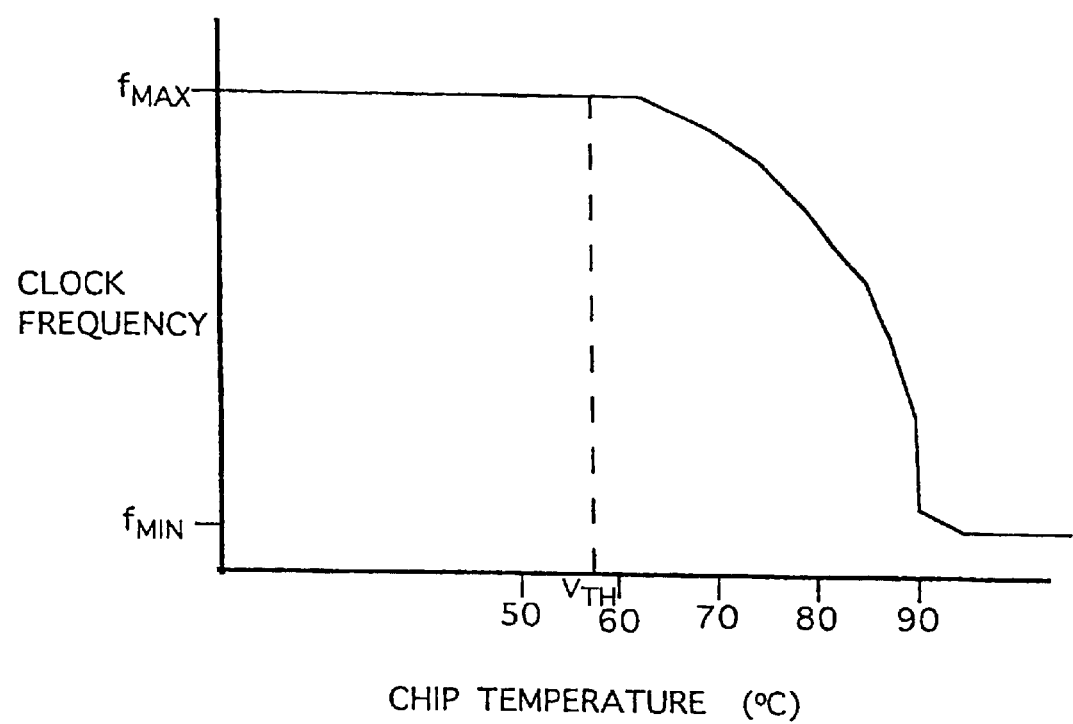
FIG. 2 is a graph of an example of the relationship of chip temperature of a microprocessor and frequency of a clock signal.

FIG. 2 is a graph of an example of the relationship of chip temperature of the microprocessor 2 and clock frequency of the clock signal 10. The clock frequency varies between a maximum frequency ($f_{MAX}$) and a minimum frequency ($f_{MIN}$) for given microprocessor. The minimum frequency ($f_{MIN}$) may be zero if the clock signal 10 is not responsible for refreshing dynamic memory; otherwise, it cannot fall below some minimum frequency. Notice that as the chip temperature increases beyond some threshold temperature (VTH) (e.g., 120 degrees F.), the frequency of the clock signal 10 will gradually decrease. By decreasing the clock frequency in relation to the chip temperature, processing speed can be maximized for a given temperature without risking processor overheating. As the chip temperature become "hot", the clock frequency is reduced so as to reduce the thermal heat generated by the microprocessor 2. The profile of the curve for the clock frequency shown in FIG. 2 is illustrative as other curves may be used. For example, the frequency of the clock signal 10 could be controlled so that the chip temperature is maintained in a more limited temperature range. In any case, the profiles of the curves decrease the clock frequency as the temperature increases.

Figure 3:
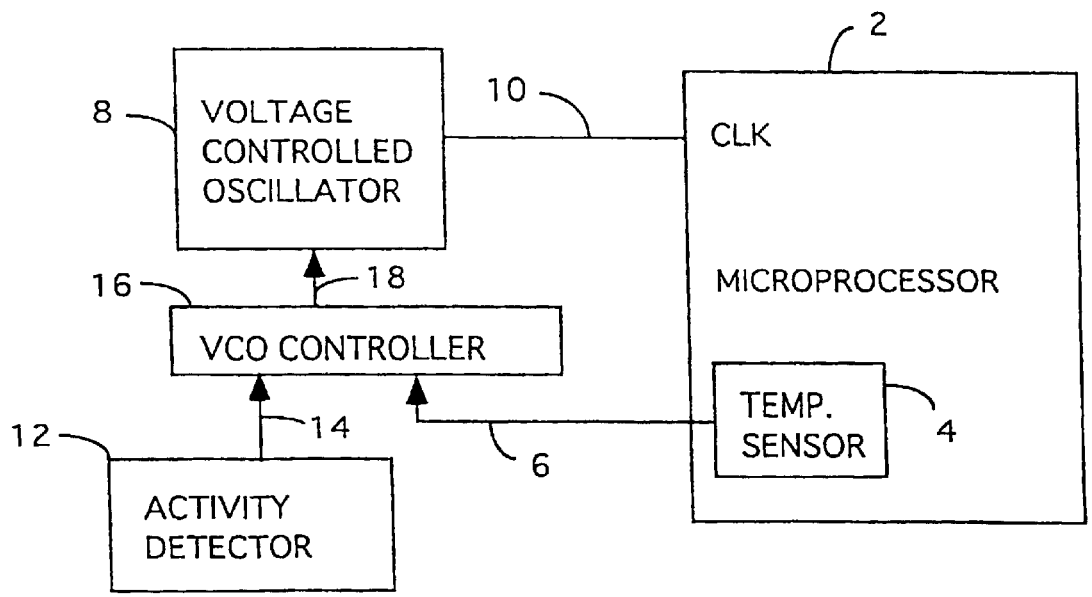
FIG. 3 is a block diagram of a second embodiment of the invention.

FIG. 3 is a block diagram of a second embodiment of the invention. In this embodiment, the microprocessor 2, temperature sensor 4, the temperature signal 6, the VCO 8, and the clock signal 10 are similar to those utilized in the first embodiment. However, this embodiment further includes an activity detector 12, an activity signal 14, a VCO controller 16, and a control signal 18.

The activity detector 12 monitors the microprocessor 2 and/or some related peripheral device (e.g., interrupt controller, keyboard buffer, input/output ports, instruction cache, current instruction, program counter) to determine when the microprocessor 2 is actively processing or when processing is needed. In this case, the activity detector 12 notifies the VCO controller 16 that processing is needed with the activity signal 14. On the other hand, when no activity exists, the activity detector 12 notifies the VCO controller 16 that no processing is needed with the activity signal 14. The activity signal is preferably a digital signal having at least one bit. Activity detection is described in more detail in U.S. Pat. Nos. 5,201,059; 5,167,024; 5,218,704; 5,239,652; and European patent publication EP-0474963, which are hereby incorporated by reference.

The VCO controller 16 receives the activity signal 14 and the temperature signal 6. In response to these signals, the VCO controller 16 produces the control signal 18 which controls the VCO 8. The control signal 18 may be analog or digital depending on the design of the VCO 8. The basic operation of the VCO controller 16 is to cause the VCO 8 to produce the clock signal 10 for the microprocessor 2 in an intelligent manner so as to conserve energy and prevent overheating. Namely, if the activity detector 12 indicates that no processing is needed at a given point in time, then regardless of the temperature detected by the temperature sensor 4, the VCO controller 16 will cause the VCO 8 to produce a sleep (or slow) clock. The sleep clock has a frequency near the minimum frequency ($f_{MIN}$). On the other hand, if the activity detector 12 indicates that processing is needed at this point in time, then the VCO controller 16 will cause the VCO 8 to produce a fast clock. The fast clock is the temperature-regulated maximum frequency such as discussed in FIGS. 1 and 2.

The second embodiment is particularly advantageous for portable computing devices because it conserves battery life by using a sleep clock when no processing is needed. However, even in the case of prolonged processing, the embodiment prevents overheating.

Figure 4:
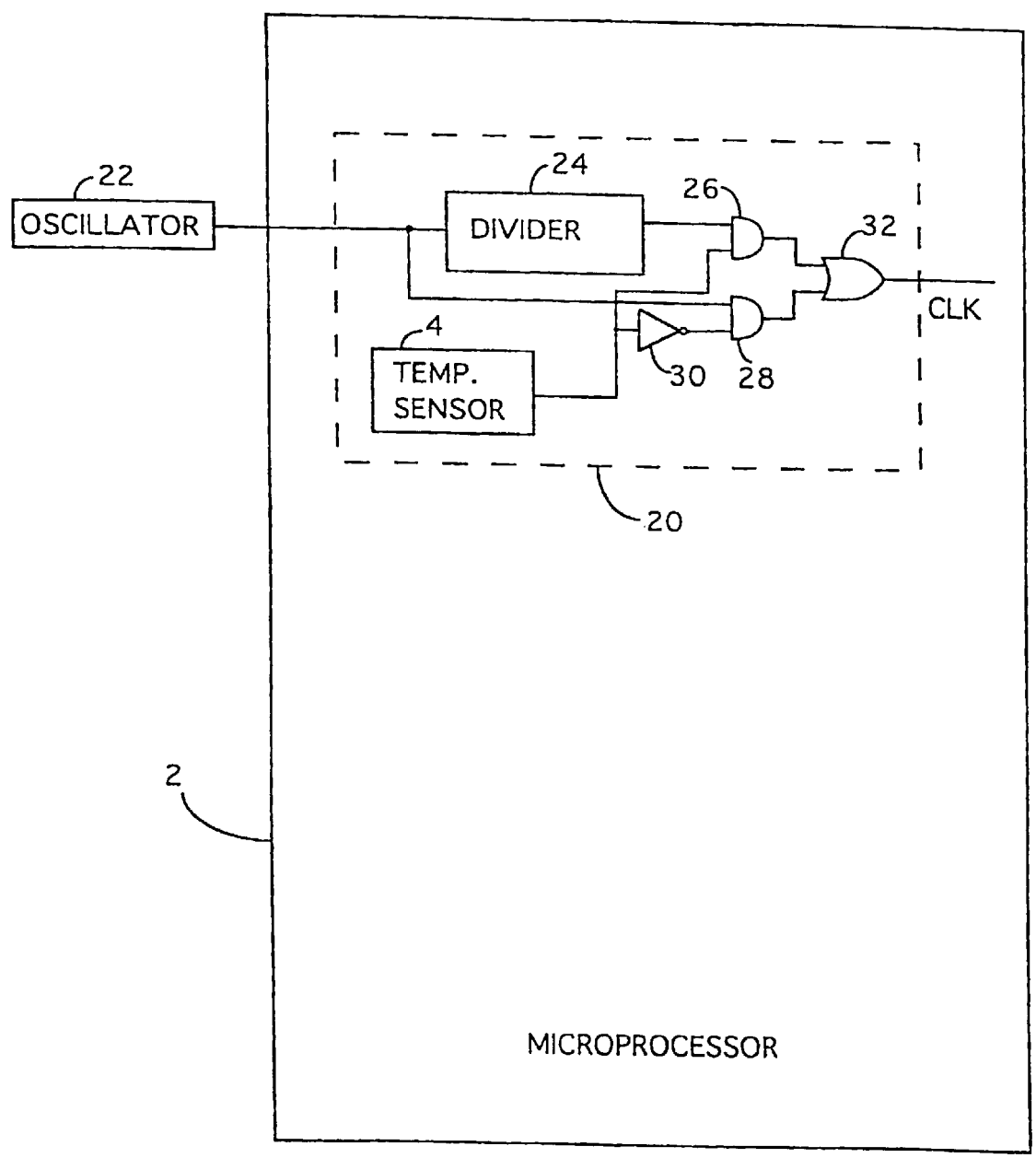
FIG. 4 is a block diagram of a third embodiment of the invention.

FIG. 4 is a block diagram of a third embodiment of the invention. In this embodiment, the microprocessor 2 includes a clock regulation unit 20 which controls the frequency of the clock used by the microprocessor 2 based on chip temperature of the microprocessor 2. Preferably, the clock regulation unit 20 is integrated with circuitry of the microprocessor 2. Alternatively, the clock regulation unit 20 can be separate from the circuitry of the microprocessor 2 but nevertheless coupled thereto.

The clock regulation unit 20 receives an input clock from an oscillator 22 and produces an output clock which is used by the microprocessor 2. The clock regulation unit 20 includes a temperature sensor 4, a divider 24, a first AND gate 26, a second AND gate 28, an inverter 30 and an OR gate 32. The temperature sensor 4 is as previously described. The divider 24 divides the input clock (fast clock) from the oscillator 22 to produce a sleep (or slow) clock. For example, if the oscillator 22 is a 100 MHz fixed-frequency oscillator and the divider 24 divides by 100, then the sleep clock would be 1 MHz.

In this embodiment, the temperature sensor 4 produces a digital output. It is assumed that the digital output is normally "0", but when the microprocessor 2 becomes "hot", the digital output becomes "1". The digital output of the temperature sensor 4 together with the logic gates 26–32 operate to select either the fast clock or the sleep clock as the output clock which is used by the microprocessor 2. In particular, when the microprocessor 2 is not "hot", AND gate 26 is inactivated and AND gate 28 is activated by inverter 30. Hence, the output clock is the fast clock via AND gate 28 and OR gate 32. On the other hand, when the microprocessor 2 is "hot", AND gate 26 is activated and AND gate 28 is inactivated. Accordingly, in this case, the output clock is the sleep (or slow) clock via AND gate 26 and OR gate 32.

Figure 5:
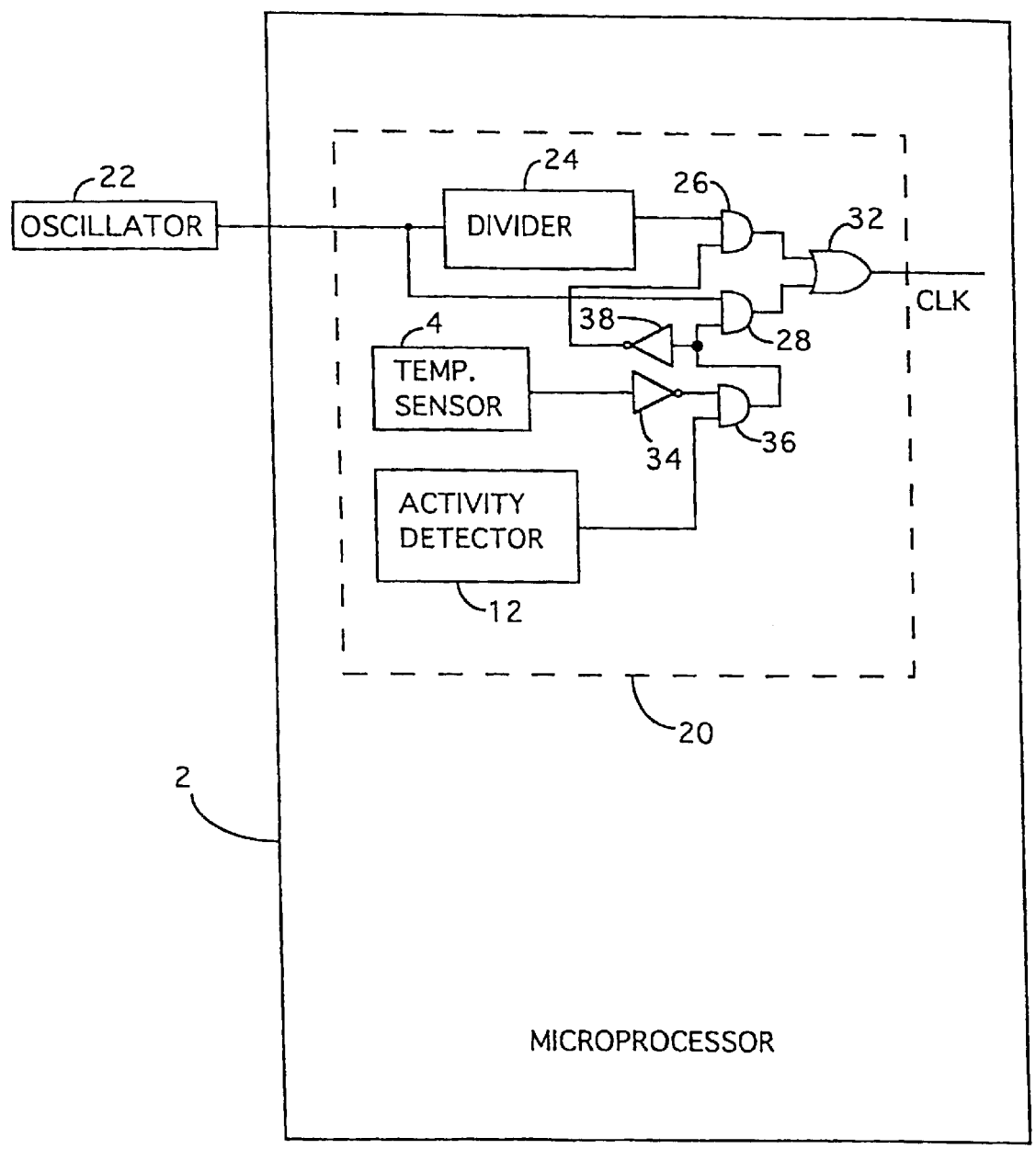
FIG. 5 is a block diagram of a fourth embodiment of the invention.

FIG. 5 is a block diagram of a fourth embodiment of the invention. In this embodiment, the microprocessor 2 includes a clock regulation unit 20 which controls the frequency of the clock used by the microprocessor 2 based on chip temperature of the microprocessor 2 and processing activity. The clock regulation unit 20 is preferably integrated with circuitry of the microprocessor 2.

As with the third embodiment, the clock regulation unit 20 for the fourth embodiment receives the input clock from the oscillator 22 and produces the output clock which is used by the microprocessor 2. The clock regulation unit 20 includes the temperature sensor 4, the divider 24, the first AND gate 26, the second AND gate 28, and the OR gate 32 as described above with reference to FIG. 4. The divider 24 divides the input clock (fast clock) from the oscillator 22 to produce a sleep clock. The temperature sensor 4 produces a digital output. Although the digital output from the temperature sensor 4 is normally "0", when the microprocessor 2 becomes "hot", the digital output becomes "1". The activity detector 12 produces an activity signal as described in the second embodiment. Here, the activity signal is a digital signal which is "high" or "1" when activity is present and "low" or "0" when no activity is present.

The digital output of the temperature sensor 4 together with the activity signal from the activity detector 12 and the logic gates 26, 28, 32, 34, 36 and 38 operate to select either the fast clock or the sleep clock. In particular, when the microprocessor 2 is not "hot" and activity is present, the AND gate 36 is activated by the inverter 34 and the activity signal. The output of AND gate 36 then activates AND gate 28 and inverter 38 inactivates AND gate 26. Hence, the output clock is the fast clock via AND gate 28 and OR gate 32. On the other hand, when the microprocessor 2 is "hot", the AND gate 36 is inactivated by the inverter 34 regardless of the activity signal. The output of AND gate 36 inactivates AND gate 28, and inverter 38 activates the AND gate 26. In this case, the output clock is the sleep clock via AND gate 26 and OR gate 32.

Figure 6:
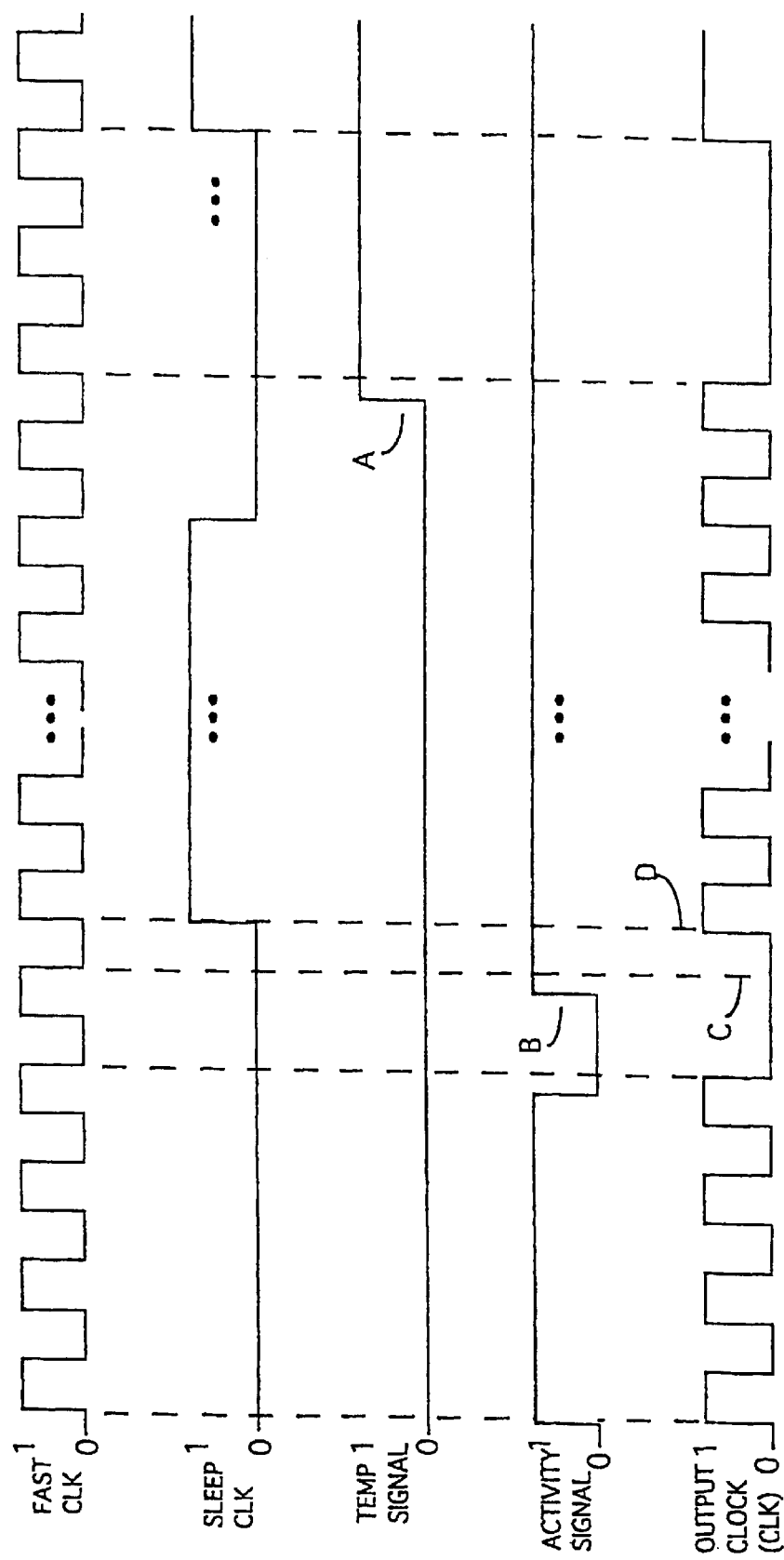
FIG. 6 is a timing diagram illustrating operation of the fourth embodiment.

FIG. 6 is a timing diagram illustrating operation of the fourth embodiment. The output clock (CLK) is a mixture of the fast clock produced by the oscillator 22 and the sleep clock produced by the divider 24. The temperature signal is the digital output of the temperature sensor 4. The temperature signal is "0" while the chip temperature is not "hot". However, when the chip temperature becomes "hot", the temperature signal becomes "1" as shown at point A. The activity signal is "1" when activity is present for processing by the microprocessor 2; otherwise, the activity signal is "0" to indicate no activity is present for processing. As shown in FIG. 6, the output clock follows the fast clock only when the temperature signal is "0" and the activity signal is "1"; otherwise, the output clock follows the sleep clock. Note that the transitions for the output clock from fast clock to sleep clock and from sleep clock to fast clock are shown as being synchronized with the low or "0" portion of the fast clock. For example, at point B the output clock would produce a partial pulse (from the fast clock) if not synchronized. Hence, it is probably preferred that switching occur only when the fast clock is "low," or when both the fast and sleep clocks are "low" as shown at point C. Note that at point C, the output clock transitions from the sleep clock to the fast clock but because the transition is synchronized with the "low" portion of the fast clock, the first pulse does not occur until point D. Such synchronization can be insured by the addition of known circuitry.

Figure 7:
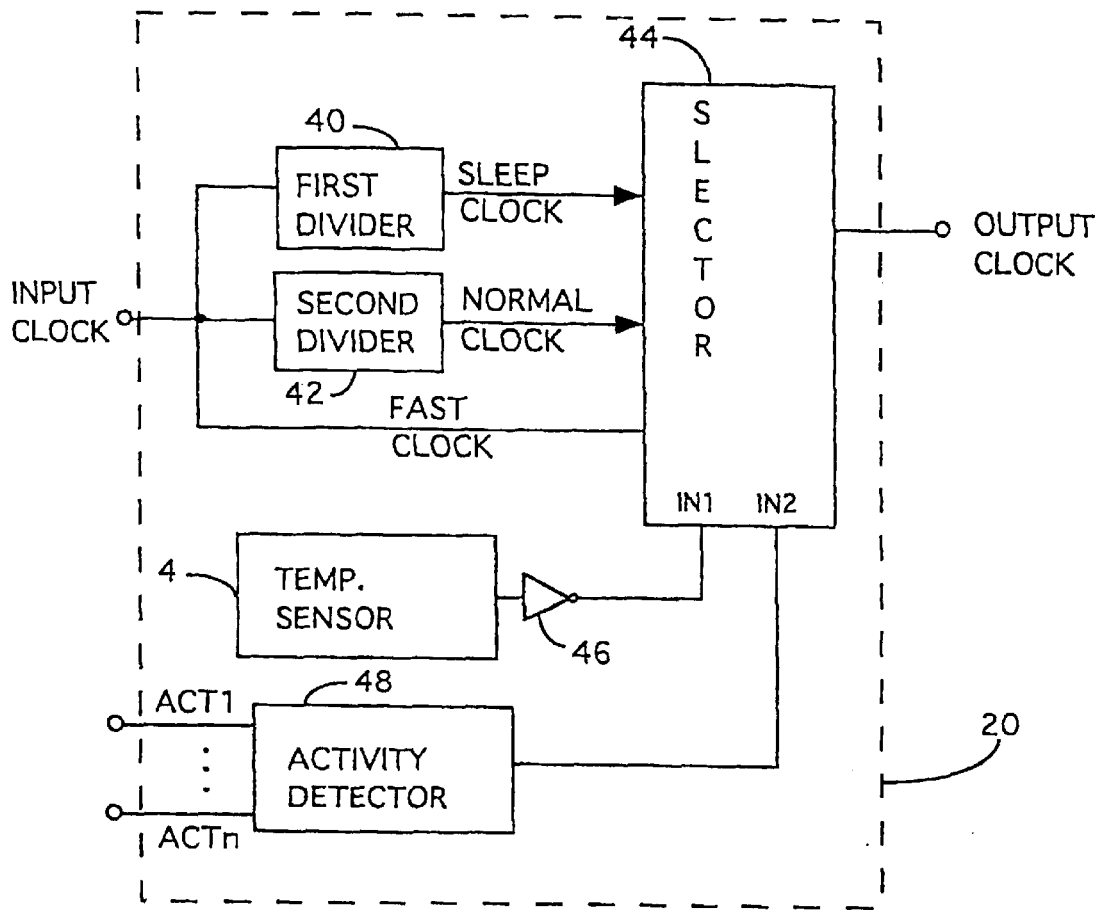
FIG. 7 is a block diagram of a fifth embodiment of the invention.

FIG. 7 is a block diagram of a fifth embodiment of the invention. Although only the clock regulation unit 20 is illustrated in FIG. 7, the fifth embodiment interacts with an oscillator 22 and a microprocessor 2 as did the third and fourth embodiments. In this embodiment, the clock regulation unit 20 includes a first divider 40 which divides the input clock (fast clock) to produce a sleep clock, and a second divider 42 which divides the input clock to produce a normal clock. The three clocks (sleep, normal and fast) are then supplied to a selector 44. The selector 44 outputs one of the three clocks as the output clock for the microprocessor 2 based on first and second select inputs IN1 and IN2. The first select input IN1 is generated by inverting the digital output from the temperature sensor 4 using an inverter 46. The second select input IN2 is generated by an activity detector 48 which functions similarly to the activity detector 12 in previous embodiments.

Figure 8:
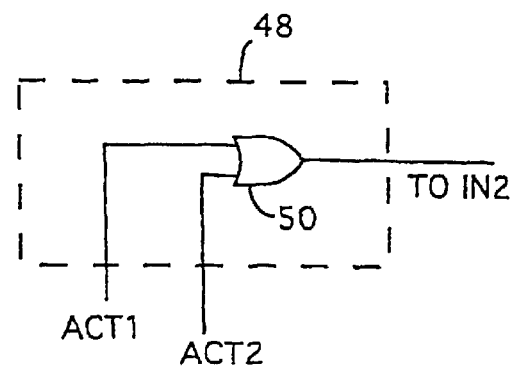
FIG. 8 illustrate a schematic diagram of an embodiment of an activity detector.

The activity detector 48 receives a plurality of activity inputs ACT 1, ..., ACTn. For example, the activity inputs notify the activity detector 48 whether or not activity exists. Each of the activity inputs may, for example, indicate an interrupt, keyboard activity, modem line activity, I/O port activity, or processor activity. As an example, FIG. 8 illustrates a schematic diagram of an embodiment of the activity detector 48. The activity detector 48 includes a OR gate 50 which outputs a "1" when either the activity input ACT1 or the activity input ACT2 is "1". If neither the activity signals ACT1 and ACT2 are "1", then the OR gate 50 outputs a "1", thereby indicating the presence of activity.

The following Table I illustrates the selection of one of the three clocks by the selector 44 based on the first select input IN1 and the second select input IN2.

TABLE I

| IN1 | IN2 | CLK Mode |
|-----|-----|----------|
| 0 | 0 | Sleep |
| 0 | 1 | Fast |
| 1 | 0 | Sleep |
| 1 | 1 | Normal |

Note that when no activity is detected by the activity detector 48, then the sleep clock is output. However, when activity is detected, then the normal clock is output if the chip temperature is "hot" and the fast clock is output if the chip temperature is not "hot". Like previous embodiments, this embodiment prevents overheating and conserves energy. Many alternatives can be made to the third, fourth and fifth embodiments discussed above. For example, additional clocks with different clock frequencies could be provided and selected for different temperature ranges to provide a more gradual decrease in frequency. However, if a microprocessor has sufficient thermal heat dissipation, then even the embodiment with only two different clock frequencies (fast and sleep) may provide reasonable processing speeds even when the microprocessor is getting hot because the switching between the clocks would be quite fast as the response of the temperature sensor 4 is very rapid because it is integrated with the microprocessor. Further, although FIGS. 4, 5, and 7 illustrate the temperature sensor 4 as resident within the clock regulation unit 20, the temperature sensor 20 need only be electrically coupled thereto and closely thermally coupled to the microprocessor 2.

Figure 9:
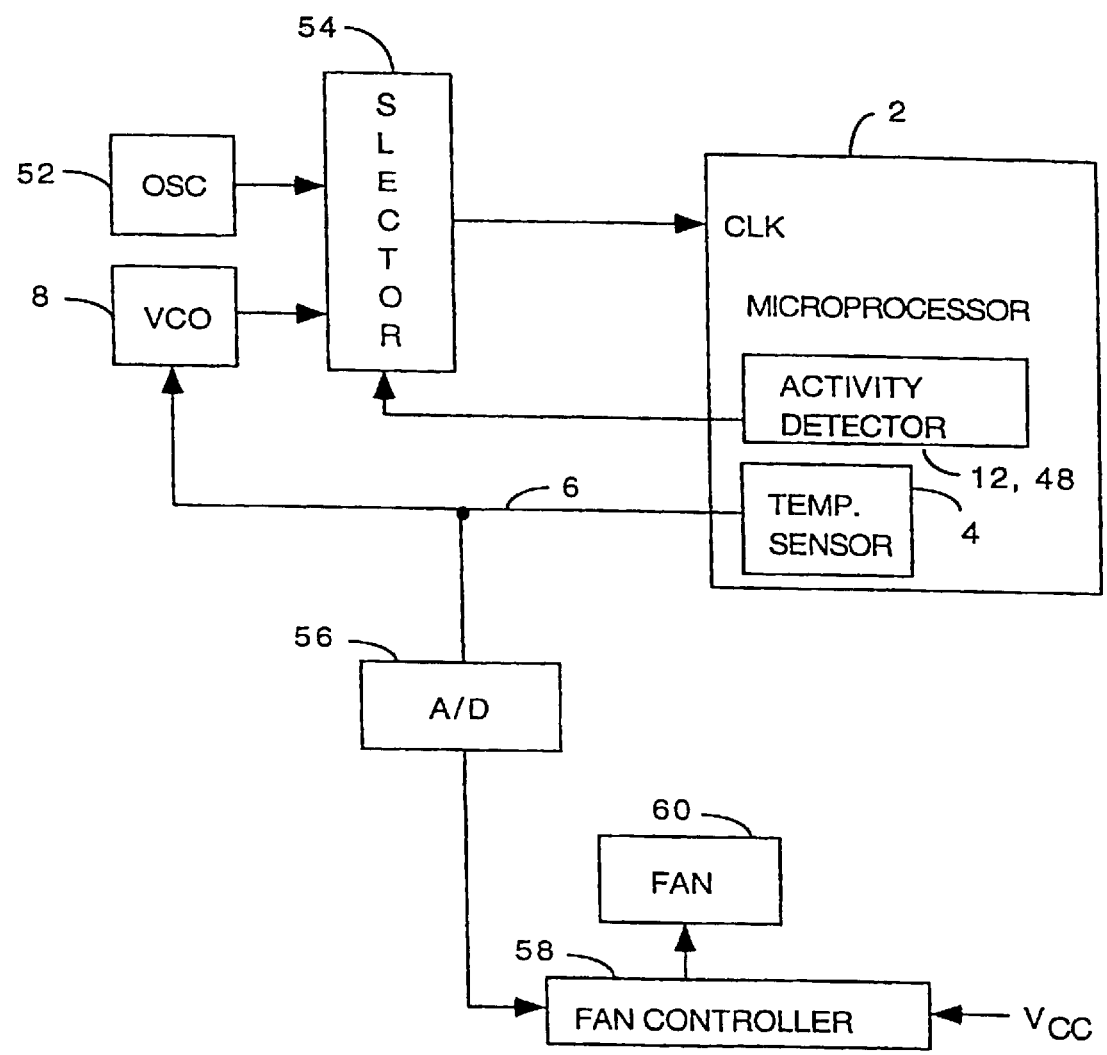
FIG. 9 is a block diagram of a sixth embodiment of the invention.

FIG. 9 is a block diagram of a sixth embodiment of the invention. In this embodiment, the clock (CLK) received by a microprocessor 2 is either a sleep clock produced by an oscillator 52 or a temperature-regulated fast clock produced by a VCO 8 in accordance with a temperature signal 6 (analog) from a temperature sensor 4. Clock selection is achieved by a selector 54 based on an activity signal 14 provided by an activity detector 12, 48. The VCO 8, the temperature sensor 4 and the activity detector 12, 48 were discussed above with respect to previous embodiments. If activity is present, the temperature-regulated fast clock is supplied to the microprocessor 2. On the other hand, if no activity is detected, then the sleep clock is supplied to the microprocessor 2. The temperature regulation of the fast clock is achieved by the analog temperature signal as discussed above with regard to FIGS. 1 and 2.

Additionally, FIG. 9 illustrates an additional feature of the invention. Namely, FIG. 9 includes an analog-to-digital converter 56, a fan controller 58 and a cooling fan 60. Many conventional computing systems include a fan for circulating air through a computer's cabinet or add-on fans that provide air-flow on or near a microprocessor. Such add-on fans can be activated in accordance with ambient temperature. In contrast, the invention allows more accurate temperature monitoring of the microprocessor 2 because the temperature sensor 4 is integrated with the microprocessor 2. In addition, the invention facilitates more sophisticated energy conservation which is particularly important for portable computing devices. The temperature signal 6 is converted to digital form by the A/D converter 56 and then supplied to the fan controller 58. The fan controller 58 performs a pulse-width modulation operation on a supply voltage (Vcc) so as to control the speed of the fan 60. Pulse-width modulation of the supply voltage allows the speed of the fan to be controlled without wasting energy. Thus, this embodiment further includes a temperature-activated, variable-speed fan.

In the case of a desk-top computing device, it is desirable to activate the fan 60 just prior to the temperature where the fast clock would be regulated downward because of high chip temperature. On the other hand, in the case of a portable computing device, it is desirable to attempt to limit the use of the fan 60 as much as possible by allowing the fast clock to be gradually reduced with increasing temperature before utilizing the fan 60. For example, if the maximum frequency of the fast clock is 100 MHz, the fan 60 could be activated in the desk-top case before the frequency would be regulated (e.g., attempts to maintain 100 MHz). This would eliminate or delay the reduction in the frequency of the fast clock. In the portable case, the fan 60 could be activated after the frequency of the fast clock is already decreased to 25 MHz. The fan 60 would then only be used when necessary to insure reasonable processing power and even then at the lowest effective speed, thereby saving battery energy to the extent possible.

Although not shown but described with reference to FIG. 6, depending on the particular design, synchronization of the switching of the frequency may be needed to prevent partial pulse in the clock signal. Such synchronization is easily implemented using well-known circuitry. Likewise, if the computing device requires a consistent clock period during certain events (e.g., analog-to-digital conversion), then hysteresis or other circuitry can be added to restrict the ability of the frequency of the clock to be changed during certain times.

Figure 10:
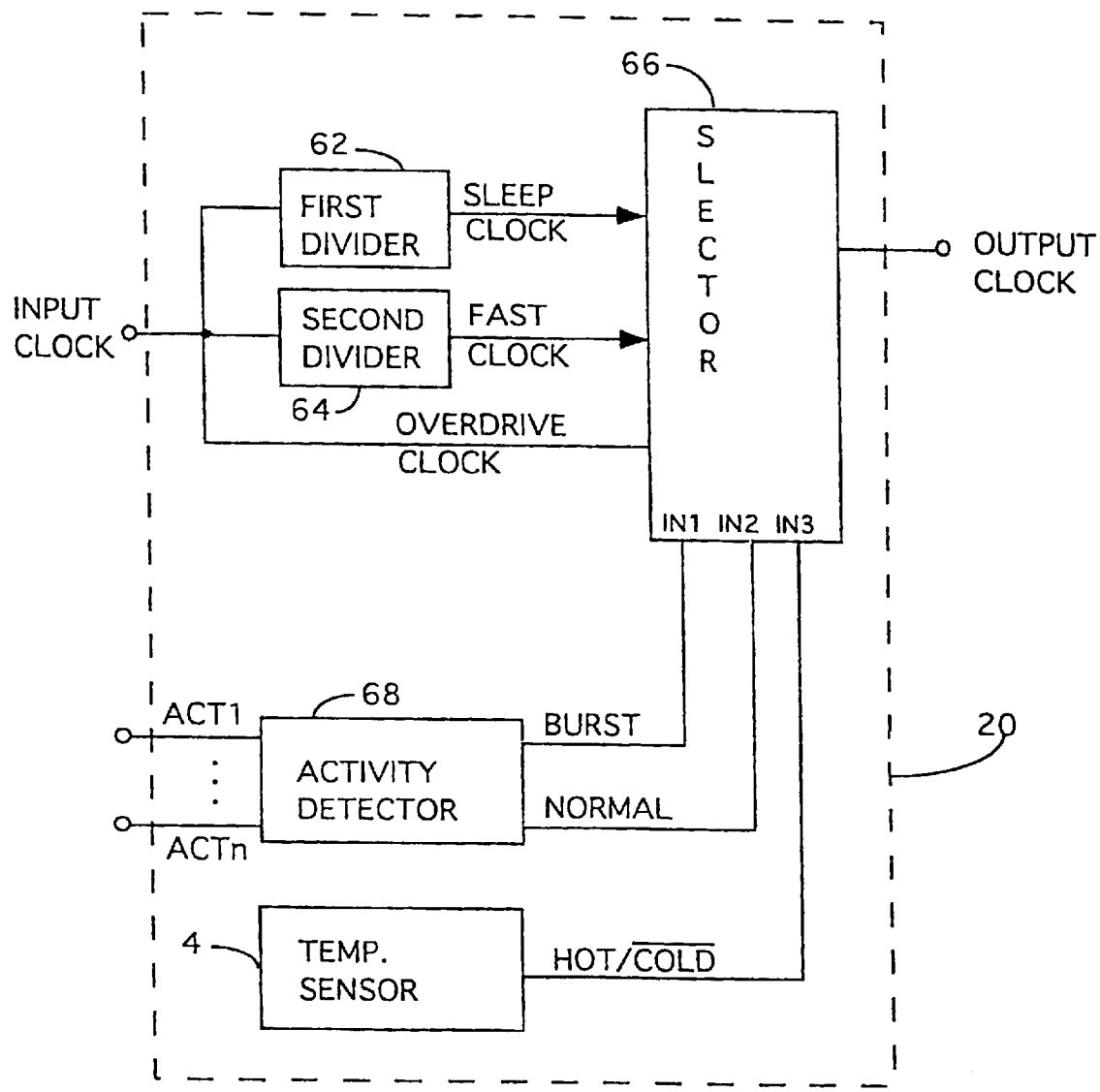
FIG. 10 is a block diagram of a seventh embodiment of the invention.

Prior embodiments operate to decrease the clock frequency of the clock signals supplied to a microprocessor to prevent overheating and to conserve energy. FIG. 10 is a block diagram of a seventh embodiment of the invention. This embodiment operates to provide a burst processing mode for use under certain conditions. During certain types of processing activity, a clock control unit 20 causes an overdrive clock to be supplied to a microprocessor 2.

Because the overdrive clock is used only in short bursts, the frequency of the overdrive clock can and preferably exceeds the frequency which sustained processing would permit without rapidly overheating.

In this embodiment, the clock control unit 20 includes a first divider 62 which divides the input clock to produce a sleep clock, and a second divider which divides the input clock to produce a fast clock. Because the input clock serves as the overdrive clock, the input clock has a clock frequency that is faster than that necessary for sufficient performance and responsiveness in most cases. The clock control unit 20 also includes a selector 66, an activity detector 68, and a temperature sensor 4. The selector 66 operates to select one of the sleep, fast or overdrive clocks based on select inputs (IN1, IN2, IN3) it receives from the activity detector 68 and the temperature sensor 4. More particularly, the activity detector 68 receives activity signals ACT1, . . . , ACTn which cause the activity detector 68 to generate a burst activity signal and a normal activity signal. Certain of the activity signals ACT trigger the burst activity signal and other activity signals trigger the normal activity signal. The temperature sensor 4 is integral with the microprocessor 2 and produces a digital temperature signal which indicates whether or not the microprocessor 2 is "hot".

The following Table II illustrates the selection of one of the three clocks by the selector 66 based on the first select input IN1, the second select input IN2, and the third select input.

TABLE II

| IN1 | IN2 | IN3 | CLK Mode |
|---|---|---|---|
| 0 | 0 | 0 | Sleep |
| 0 | 0 | 1 | Sleep |
| 0 | 1 | 0 | Fast |
| 0 | 1 | 1 | Sleep |
| 1 | 0 | 0 | Overdrive |
| 1 | 0 | 1 | Fast/Sleep |
| 1 | 1 | 0 | Overdrive |
| 1 | 1 | 1 | Fast/Sleep |

Note that when no activity (either burst or normal) is detected by the activity detector 68, then the sleep clock is output. However, when burst activity is detected, then the overdrive clock is output if the chip temperature is not "hot" and either the fast clock or the sleep clock is output if the chip temperature is "hot". The determination of which of the fast or sleep clocks to output in this situation is a design choice depending on the ability of the computing system to dissipate heat. In fact, it may be preferred to make the selection more sophisticated in this case so that a selector can make the decision using additional temperature information such as signals indicating particular temperature ranges or rate at which temperature is rising. When only normal activity is detected, then the fast clock is output if the chip temperature is not "hot" and the sleep clock is output if the chip temperature is "hot". As a modification, the second divider 64 could be replaced with a VCO thereby using a temperature-regulated fast clock.

Like previous embodiments, this embodiment prevents overheating and conserves energy. The advantage of this embodiment is that processing will appear more uniform or regular to a user.

There are certain times during normal execution of a program, the computer is caused to execute operations which are beyond or unrequested by the program being executed. Such unrequested operations include interrupt processing, and data transfer to cache memory following a cache miss. Using the overdrive clock in these types of situations is advantageous because such will substantially lessen any delay induced by these unrequested operations. A computer user then perceives that the computer's responsiveness is more regular and uniform. For example, when a cache miss occurs an instruction currently being in process is not allowed to complete until the appropriate data block is loaded into the cache. The loading of the cache follow a cache miss causes the microprocessor to execute many operations for memory management that were not requested by the computer program or the user, thereby delaying the execution of the instruction. However, because the invention performs such unrequested operations at higher speeds (overdrive clock), the impact of having to perform the extra unrequested operations is substantially lessened and hopefully invisible.

In fact, a particular computer instruction could be used to indirectly select the desired clock frequency for the instruction. This could be useful for instructions that require more intensive processing than do normal instructions. An example of intensive processing is complex floating point computations. Here, the microprocessor would indicate to the activity detector that the overdrive clock is to be used if the chip temperature is not too "hot".

Yet another embodiment would be to alter processing frequency for extremely cold situations. Namely, if the temperature sensor indicates that the chip temperature (could also use ambient temperature) is less than a predetermined minimum temperature, then the clock frequency could by set regardless of activity to its maximum value to thereby cause the generation of as much heat as possible so that the computing device could operate correctly even in extremely cold conditions. Any cooling fan of the computing device would also be shut-off using a fan controller such as shown in FIG. 9.

The many features and advantages of the present invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer, comprising:
   a processor that operates in accordance with a clock;
   a temperature sensor that provides a temperature indication of said processor;
   a multiple speed fan; and
   a thermal manager operatively connected to said processor and said fan, said thermal manager being configured to receive the temperature indication from said temperature sensor, and said thermal manager activating said fan when the temperature indication indicates that primary thermal management is required, and subsequently reducing performance of said processor when the temperature indication indicates that supplemental thermal management is required even after said fan has been activated,
   wherein, with primary thermal management, at least first and second fan speeds for said fan are used before supplemental thermal management causes reduction in the performance of said processor.

2. A computer as recited in claim 1, wherein the first fan speed corresponds to a slow speed, and the second fan speed corresponds to a fast speed.

3. A computer as recited in claim 2, wherein said temperature sensor is internal to said processor.

4. A computer as recited in claim 1, wherein said processor is a microprocessor.

5. A computer as recited in claim 1, wherein when said thermal manager activates said fan, said thermal manager causes the speed of said fan to depend on the temperature indication.

6. A computer as recited in claim 5, wherein the first fan speed corresponds to a slow speed, and the second fan speed corresponds to a fast speed.

7. A computer as recited in claim 1, wherein said thermal manager causes said fan to deactivate when said processor enters a reduced power mode.

8. A computer as recited in claim 7, wherein the reduced power mode includes at least a sleep state.

9. A computer as recited in claim 1, wherein said computer further comprises:
   an activity detector operatively connected to said processor, said activity detector determines an activity level of said processor, and
   wherein when said thermal manager activates said fan, the speed of said fan is controlled based on the temperature of said processor and the activity level.

10. A computer as recited in claim 9, wherein said temperature sensor and said activity detector are internal to said processor.

11. A computer as recited in claim 9, wherein the clock used by said processor is one of at least a first frequency and a second frequency, and wherein the activity level is used to provide dynamic switching between the first frequency and the second frequency, the second frequency being slower than the first frequency.

12. A computer as recited in claim 11, wherein said processor includes at least a CPU, and wherein the activity level pertains to an activity level of the CPU.

13. A computer as recited in claim 9, wherein when said activity detector detects that the activity level is low, said thermal manager causes a reduction in the performance of said processor.

14. A computer as recited in claim 9, wherein said thermal manager causes said fan to deactivate when said processor enters a reduced power mode.

15. A computer as recited in claim 14, wherein the reduced power mode includes at least a sleep state.

16. A computer as recited in claim 1, wherein said computer further comprises:
   an activity detector operatively connected to said processor, said activity detector identifies an activity level of said processor, and
   wherein said thermal manager causes the speed of said fan to depend on the temperature of said processor and the activity level.

17. A computer as recited in claim 1, wherein said thermal manager includes at least a fan controller and a processor performance control circuit.

18. A computer as recited in claim 1, wherein the speed of said fan is controlled at least by pulse width modulation.

19. A computer as recited in claim 1,
   wherein the performance of said processor reduces from a first level to a second level when the temperature of the exceeds a first predetermined temperature; and
   wherein the performance of said processor does not to increase from the second level back to the first level when the temperature of the processor subsequently falls below the first predetermined temperature.

20. A computer, comprising:
   a processor that operates in accordance with a clock that is in the processor and that directly sets the operation speed of the processor;
   a temperature sensor that provides a temperature indication of said processor;
   a multiple speed fan; and
   a thermal manager operatively connected to said processor and said fan, said thermal manager being configured to receive the temperature indication, and said thermal manager causes said fan speed and the clock to change in view of the one or more temperature indications,
   wherein said thermal manager causes said fan speed to change from a slow speed to a fast speed before causing a reduction in the clock rate of said clock for said processor in view of the temperature indication.

21. A computer as recited in claim 20,
   wherein said temperature sensor is in said processor, and
   wherein said thermal manager causes the speed of said fan to depend on the temperature indication of said processor.

22. A computer as recited in claim 20, wherein said thermal manager causes said fan to deactivate when said processor enters a reduced power mode.

23. A computer as recited in claim 22, wherein the reduced power mode includes at least a sleep state.

24. A computer as recited in claim 20, wherein said computer further comprises:
   an activity detector operatively connected to said processor, said activity detector identifies an activity level of said processor, and
   wherein said thermal manager causes the speed of said fan to depend on the temperature of said processor and the activity level.

25. A computer as recited in claim 20,
   wherein said thermal manager comprises a fan controller and a clock control circuit, and
   wherein said fan controller uses pulse width modulation to control the speed of said fan.

26. A computer as recited in claim 20, wherein the rate of said clock includes at least a fast rate and a slow rate, and wherein the fast rate is utilized by said processor when an interrupt occurs, thereby processing the interrupt using the fast rate.

27. A computer as recited in claim 20, wherein the rate of said clock includes at least a fast rate and a slow rate, and wherein the fast rate is used when at least one predetermined condition exists so as to insure faster performance processing by said processor than when the slow rate is used.

28. A computer as recited in claim 20, wherein said computer further comprises a battery, and
   wherein the rate of the clock is dependent on whether said computer is used as a desktop computer or a portable computer.

29. A computer, comprising:
   a processor that operates in accordance with a clock, the clock having a clock frequency;
   a temperature sensor that provides a temperature indication of said processor;
   a multiple speed fan;
   fan activation means for activating said fan when the temperature indication indicates that primary thermal management is required; and a clock controller that reduces the clock frequency of the clock for said processor when the temperature indication indicates that supplemental thermal management is required even after said fan has been activated, wherein, with primary thermal management, at least first and second fan speeds for said fan are invoked by said fan activation means before supplemental thermal management by said clock controller causes reduction in the clock frequency of the clock for said processor.

* * * * *

UNITED STATES PATENT AND TRADEMARK OFFICE
CERTIFICATE OF CORRECTION

PATENT NO. : 7,167,993 B1
APPLICATION NO. : 10/277630
DATED : January 23, 2007
INVENTOR(S) : Thomas et al.

It is certified that error appears in the above-identified patent and that said Letters Patent is hereby corrected as shown below:

On The Title Page, Item (76) Inventors, "Douglas" should be -- Douglass --.

On The Title Page, Item -56- References cited, insert:

On The Title Page, Item -56-
-- U.S. PATENT DOCUMENTS
    5,414,860    5/1995    Canova, Jr. et al.
FOREIGN PATENT DOCUMENTS
    WO 92/10032  6/1992    PCT
OTHER PUBLICATIONS
    "65 Line Notebook Computer Service Manual," First Edition, pp. I-VIII, Chapters 1-5 and Appendices A-D, August 1993.
    "65 Line Notebook Computer User's Manual," Second Edition, pp. I-XIV, Chapters 1-7, Appendices A-D and Glossary, May 1993.
    "HIGHSCREEN Colani BlueNote Notebook Computer Service Manual," First Edition, pp. I-IX, Chapters 1-5 and Appendices A-D, November 1993. --

On The Title Page Item -56- Page 3 (Other Publications), "Powder" should be
-- Power --.

On The Title Page Item -56- on page 4, (Other Publications), lines 15-17, "Nile, Preliminary Product Bulletin, Advanced PCI to PCI Bridge Interface Controller; Cirrus Logic, pp. 1-4, May 1996." should be
-- Nile II, Advance Data Book, Advanced PCI-to-PCI Bridge Interface Controller, Cirrus Logic, pages 1-4, May 1996.

UNITED STATES PATENT AND TRADEMARK OFFICE
CERTIFICATE OF CORRECTION

PATENT NO. : 7,167,993 B1
APPLICATION NO. : 10/277630
DATED : January 23, 2007
INVENTOR(S) : Thomas et al.

It is certified that error appears in the above-identified patent and that said Letters Patent is hereby corrected as shown below:

Nile, Preliminary Product Bulletin, Advanced PCI to PCI Bridge Interface Controller; Cirrus Logic, February 1996. --

Signed and Sealed this

Twenty Second Day of April, 2008

JON W. DUDAS
*Director of the United States Patent and Trademark Office*